(12) United States Patent
Laine et al.

(10) Patent No.: US 12,071,116 B2
(45) Date of Patent: Aug. 27, 2024

(54) METHOD FOR CONTROLLING AUXILIARY BRAKING BY A VEHICLE

(71) Applicant: VOLVO TRUCK CORPORATION, Gothenburg (SE)

(72) Inventors: Leo Laine, Härryda (SE); Anders Eriksson, Torslanda (SE); Gustav Neander, Gothenburg (SE); Jan-Inge Svensson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 271 days.

(21) Appl. No.: 17/756,843

(22) PCT Filed: Dec. 10, 2019

(86) PCT No.: PCT/EP2019/084372
§ 371 (c)(1),
(2) Date: Jun. 3, 2022

(87) PCT Pub. No.: WO2021/115566
PCT Pub. Date: Jun. 17, 2021

(65) Prior Publication Data
US 2023/0001898 A1    Jan. 5, 2023

(51) Int. Cl.
*B60T 8/17* (2006.01)
*B60T 8/172* (2006.01)
(Continued)

(52) U.S. Cl.
CPC .......... *B60T 8/1708* (2013.01); *B60T 8/1701* (2013.01); *B60T 8/172* (2013.01); *B60T 8/1761* (2013.01);
(Continued)

(58) Field of Classification Search
CPC ...... B60T 8/1701; B60T 8/1708; B60T 8/176; B60T 8/1761; B60T 8/17613;
(Continued)

(56) References Cited

U.S. PATENT DOCUMENTS 5,381,337 A    1/1995  Burgess
6,062,658 A *  5/2000  Stumpe ................. B60T 13/585
                                                          303/155

(Continued)

FOREIGN PATENT DOCUMENTS

CN    102770316 A    11/2012
CN    104097701 A    10/2014
(Continued)

OTHER PUBLICATIONS

Chinese Office Action dated Dec. 22, 2023 in corresponding Chinese Patent Application No. 201980102679.6, 15 pages.
(Continued)

*Primary Examiner* — Erick R Solis
(74) *Attorney, Agent, or Firm* — Venable LLP; Jeffri A. Kaminski

(57) ABSTRACT

A method for controlling a vehicle brake system for a heavy duty vehicle including a primary brake system and an auxiliary brake system. The method includes configuring a wheel slip magnitude limit, obtaining a requested auxiliary brake torque, engaging the primary brake system at a torque determined in dependence of the requested auxiliary brake torque, while monitoring a wheel slip value, determining an allowable auxiliary brake torque in dependence of the requested auxiliary brake torque and the wheel slip value, and engaging the auxiliary brake system at the allowable auxiliary brake torque.

19 Claims, 6 Drawing Sheets

(51) Int. Cl.
*B60T 8/1761* (2006.01)
*B60T 8/32* (2006.01)

(52) U.S. Cl.
CPC .......... *B60T 8/17616* (2013.01); *B60T 8/323* (2013.01); *B60T 2201/03* (2013.01); *B60T 2270/10* (2013.01)

(58) Field of Classification Search
CPC ............... B60T 8/17616; B60T 8/1763; B60T 8/17633; B60T 8/17636; B60T 8/1766
USPC ............................ 701/71, 74–76, 78, 80, 81
See application file for complete search history.

(56) References Cited

U.S. PATENT DOCUMENTS

| | | | |
|---|---|---|---|
| 6,345,225 | B1 | 2/2002 | Bohm et al. |
| 6,695,416 | B1 * | 2/2004 | Reiner .................. B60T 8/1887 303/3 |
| 2005/0052075 | A1 | 3/2005 | Sabelstrom et al. |
| 2011/0276245 | A1 | 11/2011 | Krueger et al. |
| 2013/0018559 | A1 | 1/2013 | Epple et al. |
| 2014/0324316 | A1 | 10/2014 | Yao et al. |
| 2014/0375114 | A1 | 12/2014 | Daniels et al. |
| 2015/0149056 | A1 | 5/2015 | Yao et al. |
| 2015/0203119 | A1 | 7/2015 | Bird et al. |
| 2016/0137179 | A1 * | 5/2016 | Rudberg ............... B60T 8/1761 701/71 |
| 2018/0244269 | A1 | 8/2018 | Carlsson et al. |
| 2018/0319404 | A1 | 11/2018 | Jonasson et al. |
| 2019/0176784 | A1 | 6/2019 | Laine et al. |
| 2022/0126801 | A1 * | 4/2022 | Laine .................. B60T 8/17616 |
| 2022/0402482 | A1 * | 12/2022 | Sandrasekaran ... B60G 17/0185 |

FOREIGN PATENT DOCUMENTS

| | | | | |
|---|---|---|---|---|
| JP | 2023505272 | A | 2/2023 | |
| WO | 0232737 | A1 | 4/2002 | |
| WO | WO-2006071173 | A1 * | 7/2006 | .............. B60T 10/02 |
| WO | 2007139489 | A1 | 12/2007 | |
| WO | 2017215751 | A1 | 12/2017 | |
| WO | 2018124971 | A1 | 7/2018 | |

OTHER PUBLICATIONS

Korean Office Action dated Jan. 31, 2024 in corresponding Korean Patent Application No. 10-2022-7022907, 9 pages.
International Search Report and Written Opinion in corresponding International Application No. PCT/EP2019/084372 mailed Apr. 28, 2020 (13 pages).

* cited by examiner

METHOD FOR CONTROLLING AUXILIARY BRAKING BY A VEHICLE

CROSS-REFERENCE TO RELATED APPLICATIONS

This application is a U.S. National Stage application of PCT/EP2019/084372, filed Dec. 10, 2019 and published on Jun. 17, 2021, as WO 2021/115566, all of which is hereby incorporated by reference in its entirety.

TECHNICAL FIELD

The present disclosure relates to auxiliary brakes on heavy duty vehicles, i.e., compression brakes, exhaust brakes, driveline retarders, and the like. The invention can be applied in heavy-duty vehicles, such as trucks and construction equipment. Although the invention will be described mainly with respect to cargo transport vehicles such as semi-trailer vehicles and trucks, the invention is not restricted to this particular type of vehicle but may also be used in other types of vehicles such as cars.

BACKGROUND

A vehicle such as a truck or semi-trailer often comprises auxiliary brakes in addition to its regular service brakes. The auxiliary brakes can be used for instance when driving downhill in order to spare, e.g., a disc or drum brake system from prolonged use, thereby reducing brake wear and problems relating to overheating.

The auxiliary brake system may be based on a number of known techniques, including compression brake systems and exhaust brake systems which use a vehicle combustion engine 'in reverse' for vehicle retardation instead of propulsion. Electromagnetic retarders are also known that may be engaged to slow down the vehicle while at the same time generating electrical energy.

Depending on the technology chosen, an auxiliary brake system may be quite harsh and difficult to control. If road conditions are slippery, abrupt application of hard braking from an auxiliary brake system may lead to undesired events such as jack-knifing and other vehicle stability issues. It may also be difficult to predict an impact on vehicle stability from engaging auxiliary brakes.

WO 02/32737 discloses a method for controlling an auxiliary brake such as a retarder or exhaust brake in a heavy duty vehicle. The disclosed method comprises a driver operating a brake pedal for initiating a variable braking effect by the auxiliary brake.

However, there is a need for more refined and efficient methods of auxiliary brake system control.

SUMMARY

It is an object of the present disclosure to provide improved auxiliary braking systems and methods for controlling auxiliary braking systems. This object is at least in part obtained by a method for controlling a vehicle brake system for a heavy duty vehicle. The brake system comprises a primary brake system and an auxiliary brake system. The method comprises configuring a wheel slip magnitude limit $\lambda_{LIM}$, obtaining a requested auxiliary brake torque, engaging the primary brake system at a torque determined in dependence of the requested auxiliary brake torque, while monitoring a wheel slip value $\lambda$. The method also comprises determining an allowable auxiliary brake torque in dependence of the requested auxiliary brake torque and the monitored wheel slip value $\lambda$, and engaging the auxiliary brake system at the allowable auxiliary brake torque.

This way the primary brake system is used to automatically probe road conditions before engaging the auxiliary brakes at the requested auxiliary brake torque level. Thus, differently from simply being able to configure a variable brake torque by the auxiliary brake system, the disclosed method and brake systems automatically verify that the configured torque can be safely applied without breaching the configured wheel slip magnitude limit $\lambda_{LIM}$. In case the requested auxiliary brake torque cannot be supported given current road conditions, the allowable auxiliary brake torque may represent what can be offered in terms of brake torque given current road conditions. This way an automated, efficient, and safe auxiliary brake system is provided. In particular, the risk of a jack-knifing event by a semi-trailer vehicle is significantly reduced.

The disclosed methods can be used with a wide variety of different types of auxiliary brake systems. For instance, aspects of the disclosed methods relate to auxiliary brake systems comprising any of; an electric machine, an electromagnetic retarder system, a compression brake system, and an exhaust brake system. Also, the primary brake system may comprise any of; a service brake system, a friction brake system, a regenerative brake system, and an electric machine brake system. Thus, the disclosed methods and brake systems are not limited to a single type of brake device, but can be applied with many different types of brake actuators, which is an advantage. The disclosed methods can also be used together with brake systems comprising more than one type of actuator, i.e., brake systems implementing brake blending and the like.

According to aspects, the method comprise engaging the primary brake according to a pre-determined and gradually increasing function up to the requested auxiliary brake torque. This way the probe braking becomes smooth which reduces the risk of vehicle instability or severe wheel slip condition. Backing off from the requested auxiliary brake torque may not even be noticeable since the configured wheel slip magnitude limit will be breached in a controlled manner.

According to aspects, the allowable auxiliary brake torque is reduced compared to the requested auxiliary brake torque in case the requested auxiliary brake torque cannot be obtained with a wheel slip magnitude below the configured wheel slip magnitude limit $\lambda_{LIM}$. This means that the applied torque level is automatically adjusted (reduced) to a level which can be applied without breaching configured wheel slip levels.

According to aspects, the allowable auxiliary brake torque is determined based on a maximum torque achieved by the primary brake system at a wheel slip magnitude below the configured wheel slip magnitude limit $\lambda_{LIM}$. This increases vehicle safety and also allows for an efficient use of the auxiliary brake system in that a near optimal level of auxiliary braking is applied.

According to aspects, the allowable auxiliary brake torque is determined based on the relationship $$T_{AUX} = \lambda_{PEAK} * M * C * R$$

where $T_{AUX}$ is an auxiliary brake torque, $\lambda_{PEAK}$ is the largest monitored wheel slip magnitude value, $0 < M \leq 1$ is a margin factor, C is a longitudinal tyre stiffness parameter, and R is a wheel radius. This way an allowable auxiliary brake torque can be derived directly from estimated quantities like the peak wheel slip, which is an advantage.

According to aspects, the allowable auxiliary brake torque is determined based on the relationship $$T_{AUX} = \mu_{PEAK} * F_z * R * G * M$$

where $T_{AUX}$ is an auxiliary brake torque, $\mu_{PEAK}$ is a peak estimated road friction coefficient, $F_z$ is an estimated tyre normal force, R is a wheel radius, G is a gear ratio, and $0 < M \leq 1$ is a margin factor. Again, an allowable auxiliary brake torque can be derived directly from estimated quantities like the peak friction, which is an advantage. Combinations of the expressions above can also be used with advantage.

According to aspects, the allowable auxiliary brake torque is determined to be zero in case a low friction condition is detected during the monitoring of wheel slip. Thus, auxiliary braking is prevented in case safe braking operation cannot be ensured, which is an advantage. Vehicle safety is thereby ensured.

According to aspects, engaging the auxiliary brake system comprises gradually transferring a total brake torque from the primary brake system to the auxiliary brake system. This means that total brake torque is kept constant, which is an advantage since a smoother vehicle operation is then enabled with less jerky motion.

According to aspects, the method comprises periodically transferring a total brake torque from the auxiliary brake system back to the primary brake system while monitoring wheel slip $\lambda$, and updating the allowable auxiliary brake torque based on the monitored wheel slip $\lambda$. This way the current road conditions influence auxiliary brake torque, and not just initial road conditions. Thus, if the road conditions change over time, the vehicle is able to adapt its auxiliary braking operation in an automated fashion, leading to increased safety and also improved braking efficiency.

According to aspects, the transfer of brake torque from the auxiliary brake system back to the primary brake system is triggered based on any of road temperature value, presence of rainfall, presence of snowfall, and a visual image of the road. This way the re-evaluation of auxiliary braking parameters can be triggered if conditions change based on, e.g., visual cues and other sensor reading. This leads to a faster update and potentially also to a reduced frequency of periodically transferring the total brake torque from the auxiliary brake system back to the primary brake system while monitoring wheel slip $\lambda$, since updates are now more often actively triggered by sensor data instead of the recurring updates.

According to aspects, the transfer of brake torque from the auxiliary brake system back to the primary brake system is triggered in response to an increase in wheel slip magnitude and/or in response to a change in auxiliary brake torque. If operating the auxiliary brakes at some defined torque value, which may have included a margin to an allowable slip limit, and during this auxiliary braking increases to a higher level, then it may be desirable to initiate a new probing phase using the primary brakes.

There is also disclosed herein control units, computer programs, computer readable media, computer program products, brake systems and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1A:
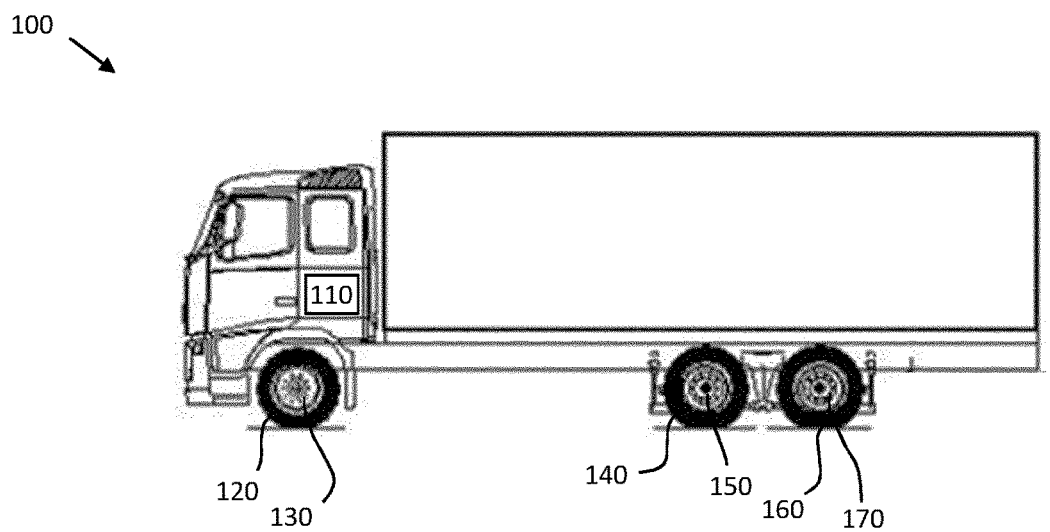
FIGS. 1A-C schematically illustrate some example heavy duty vehicles.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

Figure 1B:
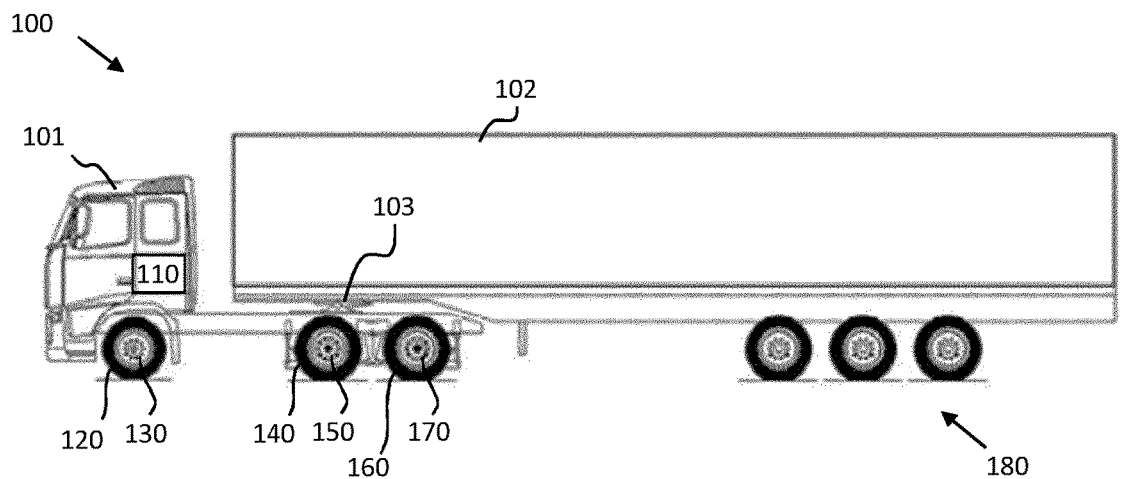
Figure 1C:
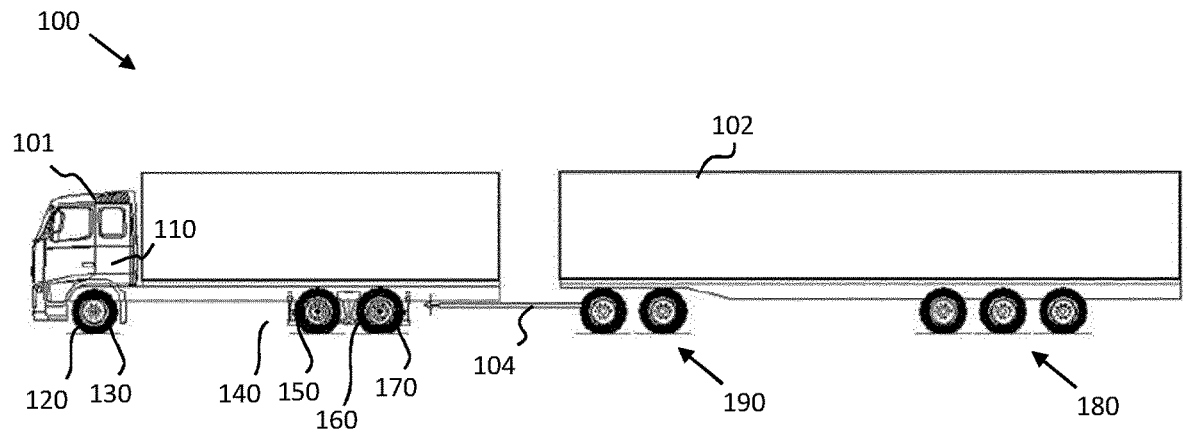

FIGS. 1A-C illustrates a number of example vehicles 100 for cargo transport where the techniques disclosed herein can be applied with advantage. FIG. 1A shows a truck supported on wheels 120, 140, and 160, some of which are driven wheels.

FIG. 1B shows a semitrailer vehicle where a tractor unit 101 tows a trailer unit 102. The front part of the trailer unit 102 is supported by a fifth wheel connection 103, while the rear part of the trailer unit 102 is supported on a set of trailer wheels 180.

FIG. 10 shows a truck with a dolly unit 104 arranged to tow a trailer unit 102. The front part of the trailer unit is then supported on a set of dolly wheels 190, while the rear part of the trailer is supported on a set of trailer wheels 180.

Each wheel, or at least a majority of the wheels, is associated with a respective wheel brake 130, 150, 160 (trailer unit wheel brakes are not indicated in FIGS. 1A-1C). This wheel brake may, e.g., be a pneumatically actuated disc brake or drum brake, but some aspects of the disclosure are also applicable for regenerative brakes which produce electrical power during vehicle retardation, and electrical machines able to slow down wheel rotational velocity upon request. The wheel brakes are controlled by brake controllers. Herein, the terms brake controller, brake modulator, and wheel end module will be used interchangeably. They are all to be interpreted as a device which controls applied braking force on at least one wheel of a vehicle, such as the vehicle 100. A primary brake system is a system which brakes the vehicle during drive operation, as opposed to a parking brake system which is configured to keep the vehicle in a fixed position when parked. The primary brake system is often referred to as the service brake system of the vehicle 100.

Each of the wheel brake controllers is communicatively coupled to a control unit 110, allowing the control unit to communicate with the brake controllers, and thereby control vehicle braking. This control unit may potentially comprise a number of sub-units distributed across the vehicle, or it can be a single physical unit. The control unit 110 may, e.g. allocate brake force between wheels to maintain vehicle stability.

The example vehicles 100 also comprise auxiliary brake systems. An auxiliary brake system is a brake system which slows down the vehicle by means other than the primary brake actuators. The auxiliary brake system may, e.g., be used with advantage during downhill driving in order to spare the primary brake system from prolonged use, which may cause excessive wear and overheating in a service brake system based on disc or drum brakes. Some example auxiliary brake systems comprise compression brakes and exhaust brakes which uses a combustion engine to slow down the vehicle. Electromechanical retarders are also known which convert motion energy into electrical power while at the same time slowing down the vehicle. Auxiliary brake systems are known in general and will therefore not be discussed in more detail herein.

Some auxiliary brake systems provide relatively powerful braking in terms of brake torque. Also, they are often difficult to control since the auxiliary brake control systems often involve relatively large time constants and course granularity when it comes to controlling torque. For instance, it takes some time to re-configure a combustion engine from being in a drive mode to acting as a retarder, and it may be difficult to predict what braking torque is obtained when braking starts.

This may be a problem, especially if the vehicle is moving over slippery road surfaces. An abrupt braking operation may cause deep wheel slip, which in turn may negatively affect vehicle stability. For example, abrupt and strong exhaust braking on the front axle wheels of a tractor may cause the vehicle combination to jack-knife, which is undesired.

Figure 2A:
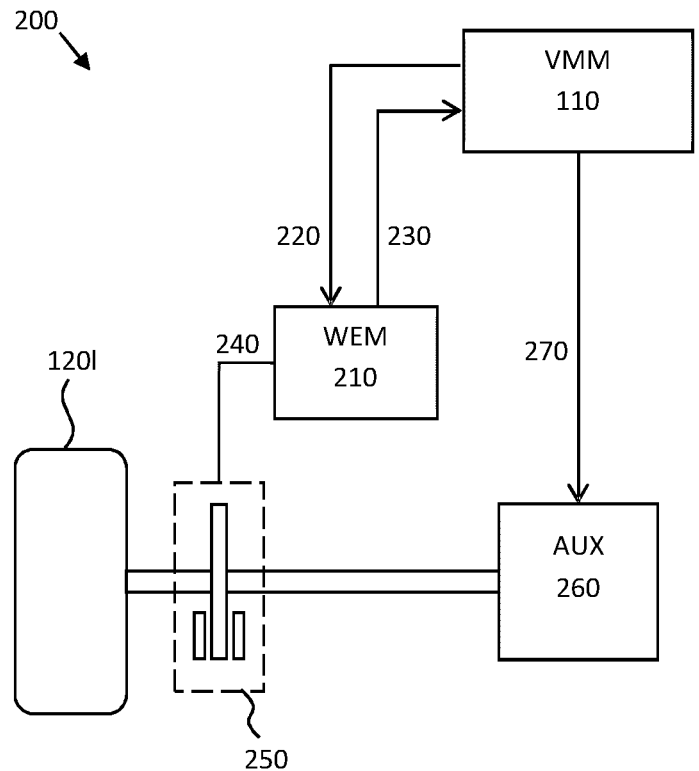
FIG. 2A shows an example brake system.

FIG. 2A illustrates a brake control system for a wheel, here exemplified by the vehicle 100 front axle left wheel 1201. The wheel comprises a wheel end module (WEM) 210 arranged to control wheel braking by a brake actuator 250, i.e., a part of a primary brake system, here exemplified by a disc brake. Note that the primary brake system may also comprise electrical machines, and also combinations of different brake actuators.

The WEM 210 controls brake torque via an interface 240 to the brake actuator 250. Longitudinal wheel slip λ may be defined as $$\lambda = \frac{R\omega - v_x}{\max(|R\omega|, |v_x|)}$$

where R is the wheel radius in meters, ω is the angular velocity of the wheel, and $v_x$ is the longitudinal speed of the wheel (in the coordinate system of the wheel). Thus, λ is bounded between −1 and 1 and quantifies how much the wheel is slipping with respect to the road surface. The vehicle control unit 110 maintains information on $v_x$ (in the reference frame of the wheel), while a wheel speed sensor can be used to determine ω. Notably, in the following, when limits on wheel slip are discussed, it is the magnitude or absolute value of the wheel slip which is limited. I.e., an increased wheel slip limit may either refer to a larger positive allowed wheel slip or a smaller negative allowed wheel slip. The present disclosure mainly considers braking, i.e., the wheel slip is normally negative herein, since $v_x > R\omega$ during braking.

Modern WEMs and primary brake systems are capable of fine grained slip control, i.e., some modern brake controllers are able to keep wheel slip λ within say +/− 0.02 of some nominal value.

The vehicle control unit 110, e.g., a vehicle motion management (VMM) system, sends brake requests 220 comprising, e.g., requested brake torque and wheel slip magnitude limit, and receives back data 230 related to, e.g., measured wheel slip, peak measured wheel slip, current braking capability in terms of, e.g., brake torque, and in some cases also estimated road friction coefficients.

The WEM then controls braking according to the requested brake torque while keeping wheel slip magnitude below the set wheel slip magnitude limit. This is made possible by the data supplied from the control unit 110 on, e.g., vehicle speed in the frame of reference of the wheel. If wheel slip magnitude exceeds the set slip limit, a slip control strategy which may comprise reducing the wheel torque generated in the primary brake system is activated such that the wheel recovers to a slip value equal to or less than the set wheel slip magnitude limit. The slip control function can be incorporated in the VMM or into the WEM or in both. According to some aspects, the VMM-based slip control loop uses one slip limit and the WEM uses a larger one. This way the WEM acts as a safety net if VMM fails to prevent excessive wheel lock.

The brake system in FIG. 2A also comprises an auxiliary brake system 260, such as a compression brake system or electromechanical retarder. This system is controlled 270 from the VMM, or control unit 110. The control of the auxiliary brake system comprises engagement operations and disengagement operations, and may also comprise configuration of a requested auxiliary brake torque.

Figure 2B:
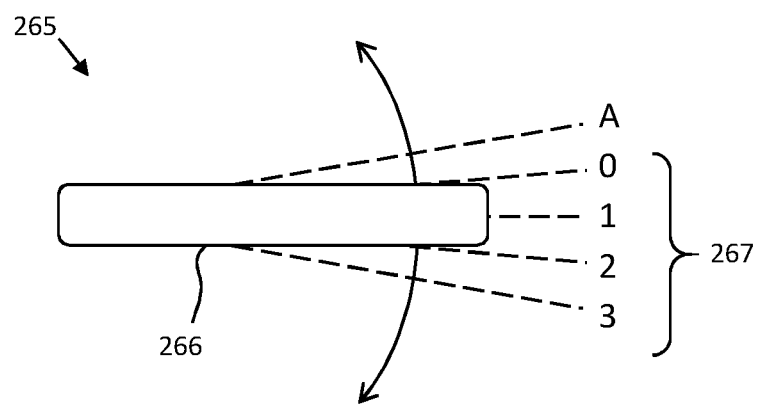
FIG. 2B schematically illustrates an auxiliary brake control device.

FIG. 2B schematically illustrates a known manual auxiliary brake control device 265. The brake control device comprises a lever 266 which can be moved between different positions. One position, denoted 'A' in FIG. 2B, is associated with an automatic brake blending operation, where the vehicle service brake system is used jointly together with the auxiliary brake system in a known manner. Other positions are used if a fixed brake torque is desired from the auxiliary brake system. These lever positions can be used by the driver to manually select a requested auxiliary brake torque from a set of discrete selectable torque values 267. Level '0' implies no requested brake torque from the auxiliary brake system, while level '3' implies large or even maximum requested brake torque from the auxiliary brake system. The discrete selectable torque values 1-3 are commonly applied directly (or after some small mechanical settling delay), and result in an abrupt application of brake torque. This application of brake torque may result in vehicle instability, especially if road friction conditions are not favorable. For instance, an abruptly applied auxiliary braking torque when driving in icy downhill conditions is likely to put the vehicle into a deep slip condition where lateral tyre forces are very hard to generate. If the downhill driving also involves negotiating a turn, the vehicle is unlikely to be able to stay on the road.

It is an object of the present disclosure to allow engagement of auxiliary brake systems also when road conditions are not favorable, e.g., when road friction is reduced due to ice. This is achieved by implementing an efficient way to limit wheel slip also when using auxiliary brake systems.

The techniques disclosed herein are based on the realization that the fine-grained slip control of modern primary brake systems can be used to effectively probe current road conditions in order to discern what wheel slips that can be expected in response to a given brake force or applied brake torque. The primary brake system can be used as friction measurement equipment, and the auxiliary brake system can then be configured in dependence of the measured friction. Thus, the drawbacks associated with abruptly engaging the often harsh auxiliary brake system can be alleviated or avoided entirely. The probing using the primary brake system is normally done on the same axle as that where the auxiliary brakes are connected. However, alternatively or as a complement, the probing with the primary brake system could be done on another axle compared to that where the auxiliary brakes are connected. For instance, it is possible to probe using the service brakes on an undriven axle, then phase that braking torque out and phase in an auxiliary braking torque on the driven axle.

Figure 3A:
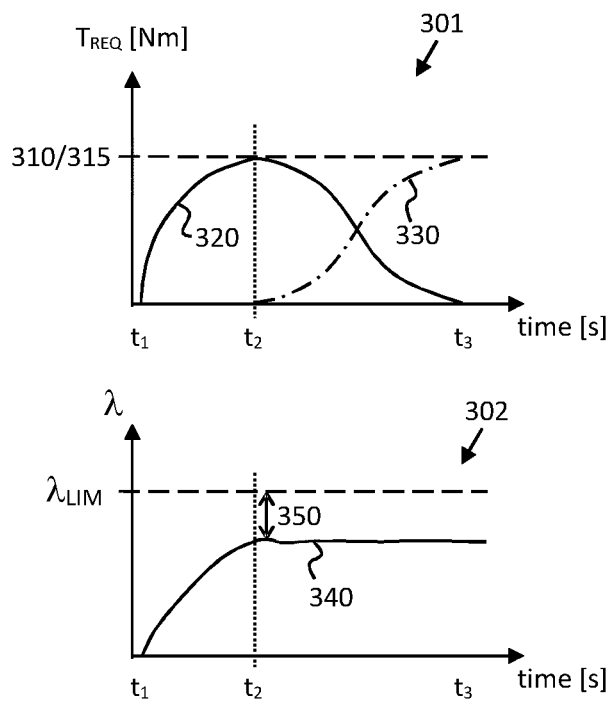
FIGS. 3A-B are graphs illustrating braking operations.
Figure 3B:
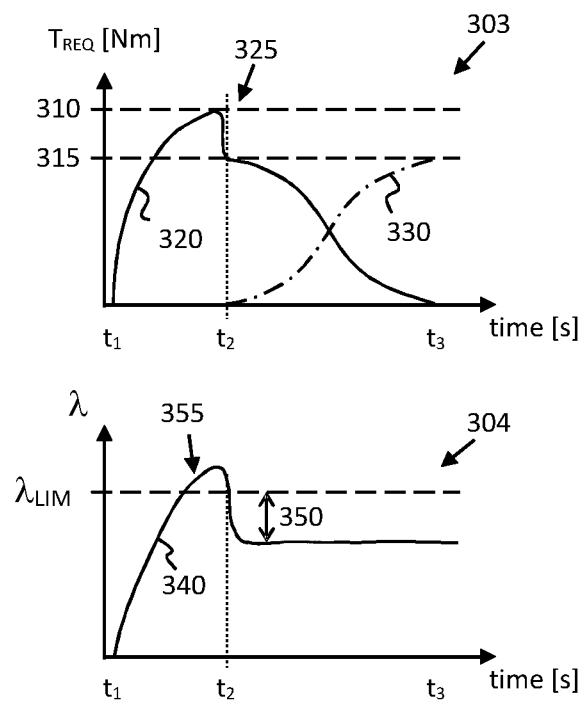

FIGS. 3A and 3B are graphs illustrating example operations by the proposed auxiliary brake control system. The top graphs 301, 303 shows requested torque over time while the bottom graphs 302, 304 show wheel slip corresponding to the graphs above.

FIG. 3A shows a successful engagement of the auxiliary brakes at a requested brake torque level 310. The auxiliary brakes are engaged at time $t_1$, however, instead of abruptly activating the auxiliary brakes, the primary brakes are first gradually engaged 320 in a controlled manner. Wheel slip 340 is monitored as the brake torque applied by the primary brakes increases. When the requested brake torque 310 has been reached, it is investigated if the wheel slip magnitude is below the configured wheel slip magnitude limit $\lambda_{LIM}$, preferably by some pre-determined margin 350. If this is the case, the brake torque can be gradually transferred over to the auxiliary brake system 330, starting at time $t_2$ and continuing until time $t_3$. Thus, at time $t_3$, the auxiliary brake system has been fully engaged at the requested torque level 310 in a safe and controlled manner without the vehicle entering into an undesired wheel slip condition.

FIG. 3B illustrates a scenario where road friction conditions are less favorable. Here, upon probing road friction by the primary brake system 320, the monitored wheel slip magnitude 340 breaches 355 the wheel slip magnitude limit $\lambda_{LIM}$. This means that the auxiliary brake system cannot safely be engaged at the requested brake torque level without subjecting the vehicle to an undesired wheel slip situation. The brake torque is reduced 325 by the WEM in order to maintain operation below the configured wheel slip magnitude limit. The wheel slip magnitude 340 decreases in response to the reduction in applied brake torque down to an acceptable level. Thus, at time $t_2$, brake torque can again be gradually transferred to the auxiliary brake system in a safe and controlled manner without risk for the vehicle entering into an undesired wheel slip situation.

As will be explained in connection to FIG. 6 below, the torque applied by the auxiliary brake system after probing road conditions by the primary brake system, herein referred to as the allowable auxiliary brake torque, can be based on a number of mechanisms. For instance, the allowable auxiliary brake torque may be determined based on a maximum torque achieved by the primary brake system at a wheel slip magnitude below the configured wheel slip magnitude limit $\lambda_{LIM}$. This means that the primary brake system, such as the service brake system, is used to check what level of brake torque that can be supported given the current driving conditions. The auxiliary brake torque is then set at this level, or below if some margin is desired.

The allowable auxiliary brake torque 315 may also be determined based on the relationship $$T_{AUX} = \lambda_{PEAK} * M * C * R$$

where $T_{AUX}$ is an auxiliary brake torque, $\mu_{PEAK}$ is the largest monitored wheel slip magnitude value, $0 < M \leq 1$ is a margin factor, C is a longitudinal tyre stiffness parameter, and R is a wheel radius, and/or based on the relationship $$T_{AUX} = \mu_{PEAK} * F_z * R * G * M$$

where $T_{AUX}$ is an auxiliary brake torque, $\mu_{PEAK}$ is a peak estimated road friction coefficient, $F_z$ is an estimated tyre normal force, R is a wheel radius, G is a gear ratio, and $0 < M \leq 1$ is a margin factor. This means that the WEM is first used to estimate some key parameters related to the current road and driving conditions. Such key data may comprise, e.g., the largest detected wheel slip and/or the largest detected road friction coefficient.

Of course, if the road conditions are found to be so unfavorable as to not allow any auxiliary braking, the auxiliary braking operation may be cancelled in its entirety, i.e., the allowable auxiliary brake torque 315 is determined to be zero.

The road conditions is preferably re-evaluated regularly, i.e., with some pre-determined frequency, such as 0.2 Hz or the like. Some sensors may also be able to predict when road friction conditions have likely changed, such as temperature sensors, rain sensors, or camera sensors able to spot formation of ice and snow on the road. In this case re-evaluation of road conditions can be actively triggered, based on the sensor input.

The slope and bank of the road may also influence wheel slip. This data can be obtained from, e.g., level sensors, and used to trigger road condition re-evaluation comprising transferring brake torque back to the primary brake system in order to monitor wheel slip to see if road conditions have changed since the last probing event.

Figure 4:
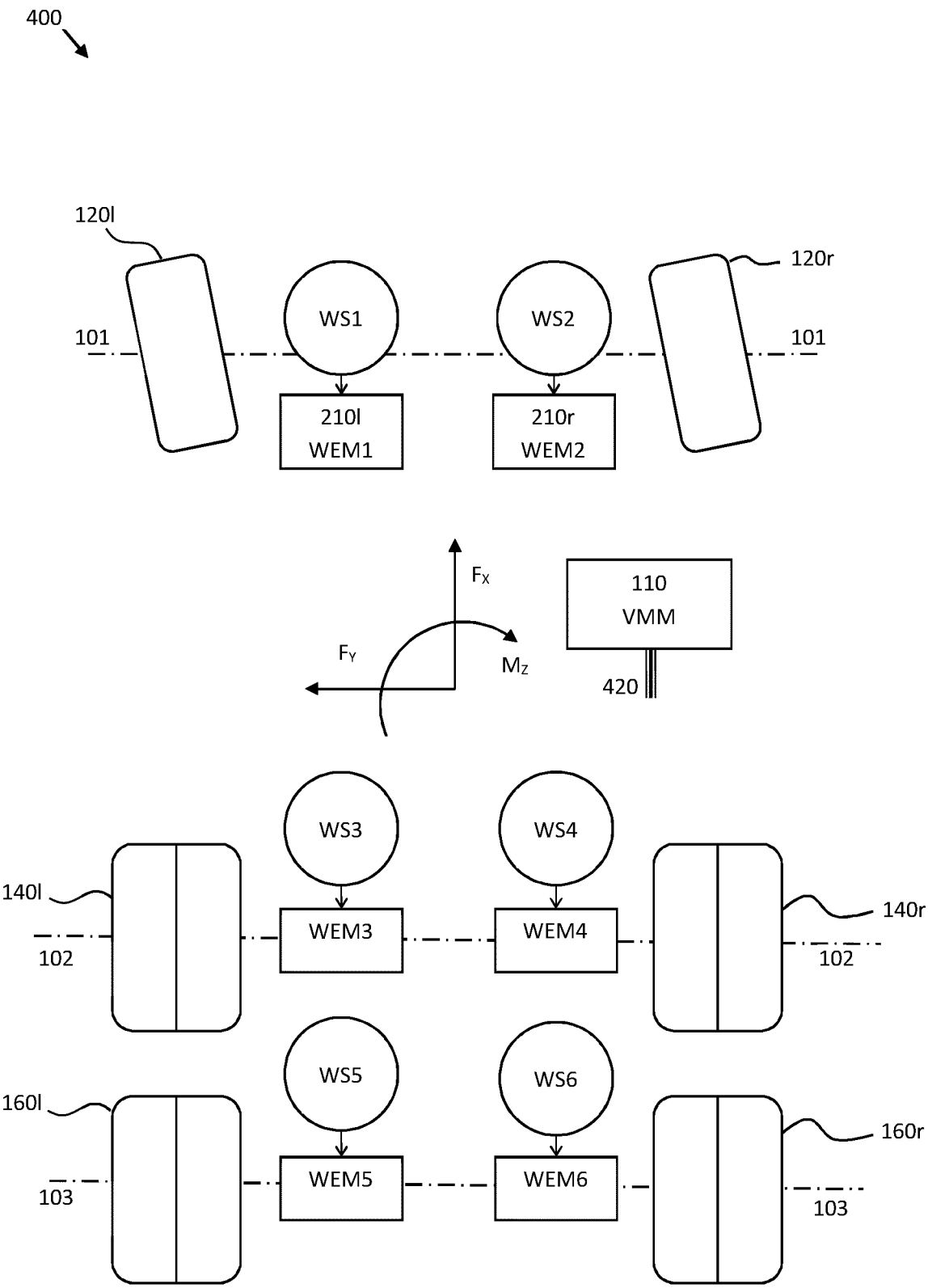
FIG. 4 illustrates an example tractor unit brake device layout.

FIG. 4 shows an example brake device system 400 layout according to the present teaching. There are two front axle wheels 1201, 120r, and four rear axle wheels 1401, 1601, 140r, 160r. It is appreciated that the principles of the present brake system can be applied to any number of rear axles, including towed vehicle units, dollies, and the like. A trailer unit brake system 500 will be discussed below in connection to FIG. 5.

Each wheel has a corresponding WEM, numbered from 1 to 6 in FIG. 4. Each wheel also has at least one associated wheel speed sensor (WS), numbered from 1 to 6 in FIG. 4. Wheel speed sensors and their use for vehicle control is known and will not be discussed in more detail herein. There is a primary brake system as well as an auxiliary brake system available for braking the vehicle 100.

A vehicle motion management module (VMM) or control unit 110 controls at least part of the vehicle braking functionality. The VMM 110 is connected by Controller Area Network (CAN) or Ethernet data bus 420 to the different WEMs.

Figure 5:
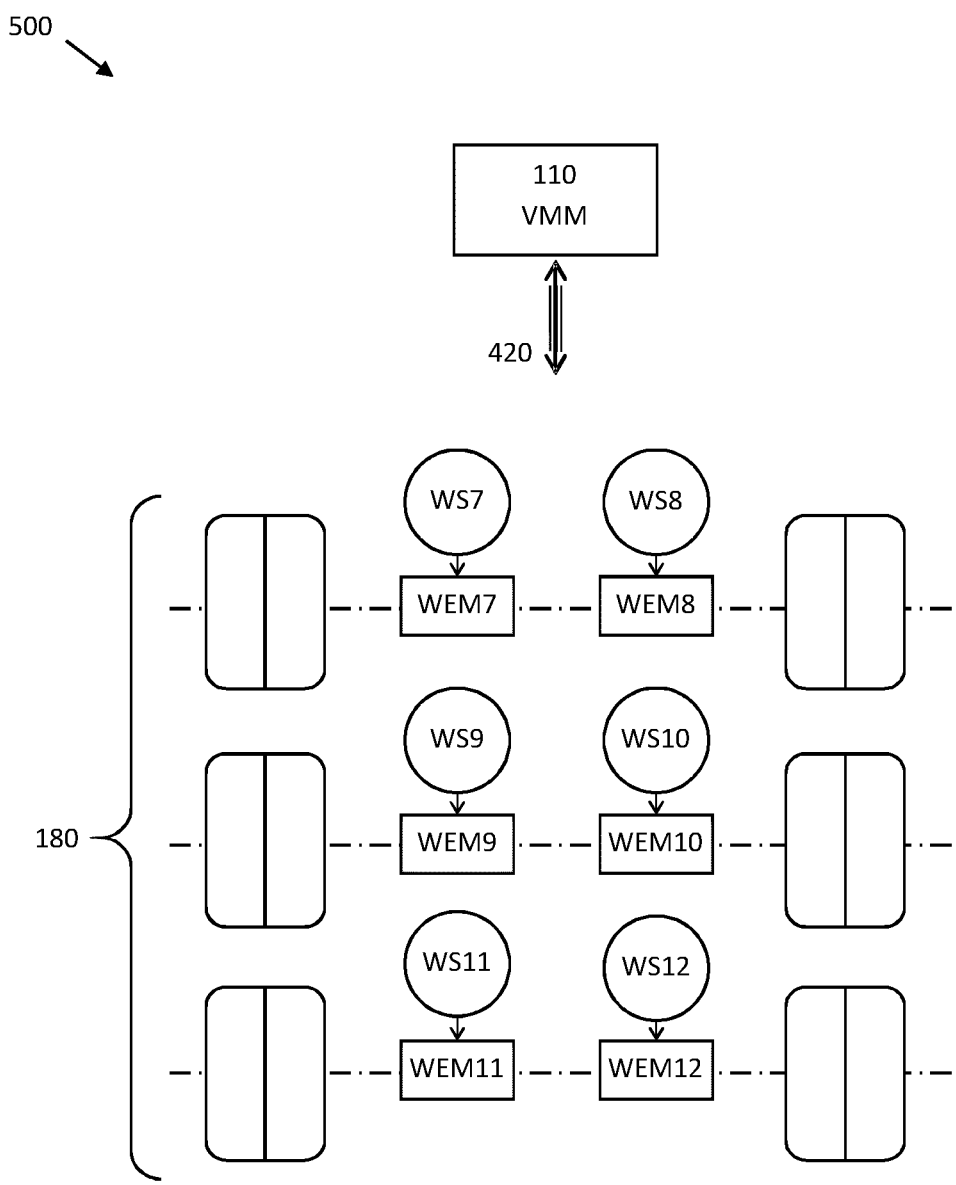
FIG. 5 illustrates an example trailer unit brake device layout.

FIG. 5 illustrates an example brake system 500 for controlling, e.g., a set of trailer wheels 180 supporting a trailer unit 102. Similar to the rear axle wheels 140, 160 in FIG. 4, the set of trailer wheels comprise primary brakes controlled by respective WEMs, numbered from 7 to 12 in FIG. 5. There are also wheel speed sensors numbered from 7 to 12 in FIG. 5.

Figure 6:
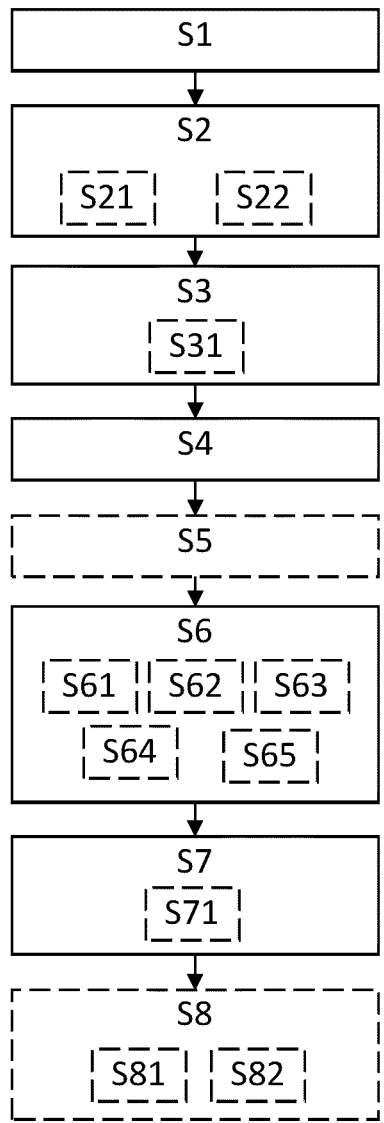
FIG. 6 is a flow chart illustrating methods.

FIG. 6 shows a flowchart which summarizes the discussions above. With reference also to the discussions above in connection to FIG. 2A, there is shown a method for controlling a vehicle brake system for a heavy duty vehicle 100. The brake system comprises a primary brake system 250 and an auxiliary brake system 260. As noted above, the auxiliary brake system 260 may comprise any of; an electric machine, an electromagnetic retarder system, a compression brake system, and an exhaust brake system, just to give a few examples. The primary brake system 250 may comprise any of; a friction brake system, a regenerative brake system, and an electric machine brake system. The primary brake system is commonly, but not necessarily, a service brake system based on friction brakes such as pneumatically or hydraulically actuated disc or drum brakes.

The method comprises configuring S1 a wheel slip magnitude limit $\lambda_{LIM}$. This wheel slip magnitude limit is normally a limit on the maximum allowable magnitude of wheel slip, i.e., how much difference is allowed between wheel rotational velocity and vehicle velocity. However, it can also be a range of allowable wheel slip values (both positive and negative) The wheel slip magnitude limit $\lambda_{LIM}$ may be configured by a VMM unit to provide vehicle stability and to maintain an ability by the vehicle to generate lateral forces needed to negotiate curves and the like.

The method also comprises obtaining S2 a requested auxiliary brake torque 310. This auxiliary brake torque 310 may, e.g., be obtained S21 by manual selection from a set of discrete selectable torque values 267 as discussed above in connection to FIG. 2B. Alternatively or as a complement, the requested auxiliary brake torque 310 can be obtained S22 from a vehicle control unit 110, such as the VMM, arranged to control a vehicle brake operation. For autonomous drive, the auxiliary brake torque is of course determined automatically by the VMM. According to some aspects, the requested auxiliary brake torque 310 may be determined in dependence of a status of the primary braking system. For instance, in case the service brakes of a vehicle 100 are in risk of overheating, then the service brake torque on the overheating units may be reduced, and the loss in total brake torque can be compensated for by adding a level of auxiliary brake torque.

Now, as discussed above, instead of directly engaging the auxiliary brake system at the requested brake torque, the method comprises engaging S3 the primary brake system 320 at a torque determined in dependence of the requested auxiliary brake torque 310, while monitoring S4 a wheel slip magnitude value $\lambda$, 340. This engaging of the primary brake system effectively measures road conditions, since the primary brake system of the vehicle 100 comprises a fine-grained slip control. For a manually driven vehicle, the engaging of the primary brake system to probe road conditions is performed automatically without the driver having to take any action. This also means that the disclosed technique is suitable for use with autonomous or semi-autonomous vehicles, where no driver is present to control the auxiliary brake torque. This probing operation is different from the operations described in WO 02/32737, which requires an experienced driver, and where the experienced driver first configures a brake level using a manual input means, which brake torque level is then maintained regardless of wheel slip or impact on vehicle stability.

At least two options exist when it comes to engaging the primary brake system 320 at the torque determined in dependence of the requested auxiliary brake torque 310. According to a first option the VMM actively adjusts the requested torque to the primary system if the wheel slip magnitude exceeds the configured slip limit. In this case the requested torque will not be reached, since the primary brake system will be made to back off in order to reduce wheel slip. However, according to a second, during the probing phase, the VMM actually applies a gradually increasing torque up to the requested torque (for a short duration of time), and then monitors wheel slip to 'read off' what auxiliary braking can be applied without breaching the configured wheel slip limit. The present disclosure may comprise any of these options, or a combination of the two.

According to aspects, the engaging of the primary brake system 320 is performed according to a pre-determined and gradually increasing function up to the requested auxiliary brake torque 310. Thus, there is no abrupt application of brake torque, which is an advantage since unfavorable road conditions can be detected in time to abort the braking operation. The pre-determined and gradually increasing function may, e.g., be a linearly increasing function of some other function, such as a second order function of time.

Some aspects of the method also comprises estimating S5 a road friction coefficient $\mu$. This road friction coefficient can be used as input for determining, e.g., when no auxiliary braking can be applied. The friction coefficient can also be estimated for separate wheels, or for the two sides of the vehicle, and used as input for the VMM to perform vehicle control.

The method also comprises determining S6 an allowable auxiliary brake torque 315 in dependence of the requested auxiliary brake torque 310 and the wheel slip value $\lambda$, 340. The allowable auxiliary brake torque is a brake torque that can be tolerated given the current road conditions and the configured slip limits. In FIG. 3A, the requested auxiliary brake torque is the same as the allowable brake torque, i.e., the request itself was found allowable given the current road conditions. However, in the example of FIG. 3B, the request was not allowable, it was too large, and the allowable auxiliary brake torque 315 is therefore smaller than the requested auxiliary brake torque 310. FIG. 3B thus shows an example of aspects of the disclosed method where the allowable auxiliary brake torque 315 is reduced S61 compared to the requested auxiliary brake torque 310 in case the requested auxiliary brake torque 310 cannot be obtained with a wheel slip magnitude below the configured wheel slip magnitude limit $\lambda_{LIM}$. This reduction in applied auxiliary brake torque improves vehicle stability and prevents the vehicle from entering into a deep wheel slip condition. Also, jack-knife events by a combination vehicle such as a semi-trailer vehicle are made much less likely.

The allowable auxiliary brake torque 315 may optionally be determined S62 based on a maximum torque achieved by the primary brake system 320 at a wheel slip magnitude below the configured wheel slip magnitude limit $\lambda_{LIM}$. Thus, the primary brake system is used to estimate what level of brake torque that can be supported given the current driving conditions, including road friction coefficient, road slope, and road banking. This maximum torque achieved by the primary brake system 320 can then be applied by the auxiliary brake system, perhaps after reduction by some margin factor or the like.

The allowable auxiliary brake torque 315 may also be determined S63 based on the relationship $$T_{AUX} = \lambda_{PEAK} * M * C * R$$

where $T_{AUX}$ is an auxiliary brake torque, $\lambda_{PEAK}$ is the largest monitored wheel slip magnitude value, $0 < M \leq 1$ is a margin factor, C is a longitudinal tyre stiffness parameter, and R is a wheel radius.

The allowable auxiliary brake torque 315 may furthermore also be determined S64 based on the relationship $$T_{AUX} = \mu_{PEAK} * F_z * R * G * M$$

where $T_{AUX}$ is an auxiliary brake torque, $\mu_{PEAK}$ is a peak estimated road friction coefficient, $F_z$ is an estimated tyre normal force, R is a wheel radius, G is a gear ratio, and $0 < M \leq 1$ is a margin factor.

Thus, the allowable auxiliary brake torque 315 may be determined based on an estimated road friction coefficient or based on a monitored wheel slip level. The allowable auxiliary brake torque 315 may also be based on combinations of the two, e.g., a weighted combination of the relationships above, such as $$T_{AUX} = \frac{a * \mu_{PEAK} * F_z * R * G * M + b * \lambda_{PEAK} * M * C * R}{a + b}$$

where a and b are pre-determined or adaptively adjusted weight factors.

In case the road conditions are too slippery for supporting any auxiliary braking, the allowable auxiliary brake torque 315 may be determined S65 to be zero. This may, for instance be the case if a low friction condition is detected during the monitoring of wheel slip. This means that the requested auxiliary braking operation is automatically cancelled in case the VMM determines that such braking cannot be safely applied. This increases vehicle safety. Also, accidental manual engagement of the auxiliary braking system, e.g., by an inexperienced driver, is prevented in case such engagement cannot be safely executed without the vehicle breaching set wheel slip limits.

The method further comprises engaging S7 the auxiliary brake system 330 at the allowable auxiliary brake torque 315. This engaging may, for instance, be performed by gradually transferring S71 a total brake torque from the primary brake system 320 to the auxiliary brake system 330. This means that the total brake torque is kept constant, which may be an advantage.

It is appreciated that road friction conditions may change over time, and even over a single downhill drive. Thus, some aspects of the disclosed method comprises periodically transferring S8 a total brake torque from the auxiliary brake system 330 back to the primary brake system 320 while monitoring wheel slip λ, 340, and updating the allowable auxiliary brake torque 315 based on the monitored wheel slip λ, 340. Thus, if road conditions change, the vehicle will adapt in order to maintain safe operation. The transfer of brake torque from the auxiliary brake system 330 back to the primary brake system 320 may for instance be triggered S81 based on any of road temperature value, presence of rainfall, presence of snowfall, road slope, road banking, and a visual image of the road.

Figure 7:
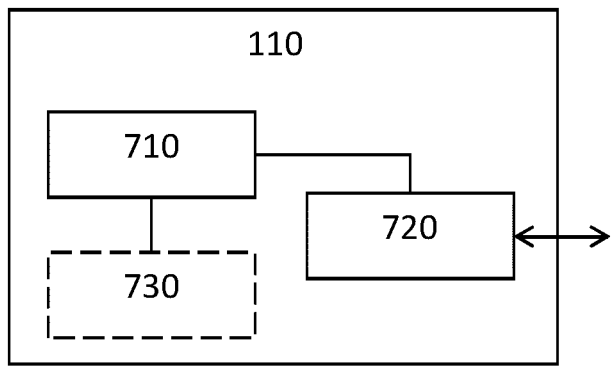
FIG. 7 schematically illustrates a control unit.

FIG. 7 schematically illustrates, in terms of a number of functional units, the components of a control unit 110 according to embodiments of the discussions herein. This control unit 110 may be comprised in the vehicle 100, e.g., in the form of a VMM unit. Processing circuitry 710 is provided using any combination of one or more of a suitable central processing unit CPU, multiprocessor, microcontroller, digital signal processor DSP, etc., capable of executing software instructions stored in a computer program product, e.g. in the form of a storage medium 730. The processing circuitry 710 may further be provided as at least one application specific integrated circuit ASIC, or field programmable gate array FPGA.

Particularly, the processing circuitry 710 is configured to cause the control unit 110 to perform a set of operations, or steps, such as the methods discussed in connection to FIG. 10. For example, the storage medium 730 may store the set of operations, and the processing circuitry 710 may be configured to retrieve the set of operations from the storage medium 730 to cause the control unit 110 to perform the set of operations. The set of operations may be provided as a set of executable instructions. Thus, the processing circuitry 710 is thereby arranged to execute methods as herein disclosed.

The storage medium 730 may also comprise persistent storage, which, for example, can be any single one or combination of magnetic memory, optical memory, solid state memory or even remotely mounted memory.

The control unit 110 may further comprise an interface 720 for communications with at least one external device such as a suspension system sensor or IMU. As such the interface 720 may comprise one or more transmitters and receivers, comprising analogue and digital components and a suitable number of ports for wireline or wireless communication.

The processing circuitry 710 controls the general operation of the control unit 110, e.g., by sending data and control signals to the interface 720 and the storage medium 730, by receiving data and reports from the interface 720, and by retrieving data and instructions from the storage medium 730. Other components, as well as the related functionality, of the control node are omitted in order not to obscure the concepts presented herein.

Thus, with reference also to FIGS. 2A, 3A, and 3B, FIG. 7 shows an example control unit 110 configured to control a vehicle brake system in a heavy duty vehicle 100. The brake system comprising a primary brake system 250 and an auxiliary brake system 260. The control unit 110 is arranged to:

configure a wheel slip magnitude limit $\lambda_{LIM}$,
obtain a requested auxiliary brake torque 310,
engage the primary brake system 320 at a torque determined in dependence of the requested auxiliary brake torque 310,
monitor a wheel slip value λ, 340,
determine an allowable auxiliary brake torque 315 in dependence of the requested auxiliary brake torque 310 and the wheel slip value λ, 340, and
engage the auxiliary brake system 330 at the allowable auxiliary brake torque 315.

Figure 8:
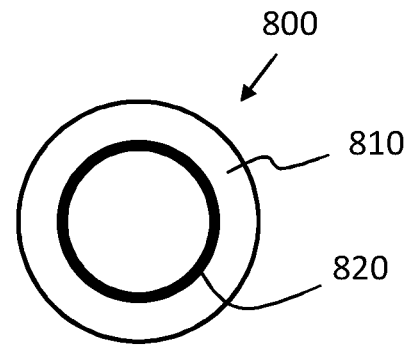
FIG. 8 shows an example computer program product.

FIG. 8 illustrates a computer readable medium 810 carrying a computer program comprising program code means 820 for performing the methods illustrated in FIG. 6, when said program product is run on a computer. The computer readable medium and the code means may together form a computer program product 800.

The invention claimed is:

1. A method for controlling a vehicle brake system for a heavy duty vehicle, the brake system comprising a primary brake system and an auxiliary brake system, the method comprising:
configuring a wheel slip magnitude limit,
obtaining a requested auxiliary brake torque,
engaging the primary brake system at a torque determined in dependence of the requested auxiliary brake torque, while
monitoring a wheel slip value,
determining an allowable auxiliary brake torque in dependence of the requested auxiliary brake torque and the monitored wheel slip value, and
engaging the auxiliary brake system at the allowable auxiliary brake torque.

2. The method according to claim 1, wherein the auxiliary brake system comprises any of; an electric machine, an electromagnetic retarder system, a compression brake system, and an exhaust brake system.

3. The method according to claim 1, wherein the primary brake system comprises any of; a service brake system, a friction brake system, a regenerative brake system, and an electric machine brake system.

4. The method according to claim 1, wherein the requested auxiliary brake torque is obtained by manual selection from a set of discrete selectable torque values.

5. The method according to claim 1, wherein the requested auxiliary brake torque is obtained from a vehicle control unit arranged to control a vehicle brake operation.

6. The method according to claim 1, comprising engaging the primary brake system according to a pre-determined and gradually increasing function up to the requested auxiliary brake torque.

7. The method according to claim 1, comprising estimating a road friction coefficient.

8. The method according to claim 1, wherein the allowable auxiliary brake torque is reduced compared to the requested auxiliary brake torque in case the requested auxiliary brake torque cannot be obtained with a wheel slip magnitude below the configured wheel slip magnitude limit.

9. The method according to claim 1, wherein the allowable auxiliary brake torque is determined based on a maximum torque achieved by the primary brake system at a wheel slip magnitude below the configured wheel slip magnitude limit.

10. The method according to claim 1, wherein the allowable auxiliary brake torque is determined based on the relationship $$T_{AUX} = \lambda_{PEAK} * M * C * R$$

where $T_{AUX}$ is an auxiliary brake torque, $\lambda_{PEAK}$ is the largest monitored wheel slip magnitude value, $0 < M \leq 1$ is a margin factor, C is a longitudinal tyre stiffness parameter, and R is a wheel radius.

11. The method according to claim 1, wherein the allowable auxiliary brake torque is determined based on the relationship $$T_{AUX} = \mu_{PEAK} * F_z * R * G * M$$

where $T_{AUX}$ is an auxiliary brake torque, $\mu_{PEAK}$ is a peak estimated road friction coefficient, $F_z$ is an estimated tyre normal force, R is a wheel radius, G is a gear ratio, and $0 < M \leq 1$ is a margin factor.

12. The method according to claim 1, wherein the allowable auxiliary brake torque is determined to be zero in case a low friction condition is detected during the monitoring of wheel slip.

13. The method according to claim 1, wherein engaging the auxiliary brake system comprises gradually transferring a total brake torque from the primary brake system to the auxiliary brake system.

14. The method according to claim 1, comprising periodically transferring a total brake torque from the auxiliary brake system back to the primary brake system while monitoring wheel slip, and updating the allowable auxiliary brake torque based on the monitored wheel slip.

15. The method according to claim 14, wherein the transfer of brake torque from the auxiliary brake system back to the primary brake system is triggered based on any of road temperature value, presence of rainfall, presence of snowfall, road slope, road banking, and a visual image of the road.

16. The method according to claim 14, wherein the transfer of brake torque from the auxiliary brake system back to the primary brake system is triggered in response to a change in wheel slip/or in response to a change in requested brake torque.

17. A computer readable non-transitory medium carrying a computer program comprising program code for performing the steps of claim 1 when said program product is run on a computer or on processing circuitry of a control unit.

18. A control unit configured to control a vehicle brake system in a heavy duty vehicle, the brake system comprising a primary brake system and an auxiliary brake system, the control unit is arranged to:
configure a wheel slip magnitude limit,
obtain a requested auxiliary brake torque,
engage the primary brake system at a torque determined in dependence of the requested auxiliary brake torque,
monitor a wheel slip value,
determine an allowable auxiliary brake torque in dependence of the requested auxiliary brake torque and the wheel slip value, and
engage the auxiliary brake system at the allowable auxiliary brake torque.

19. A vehicle comprising the control unit according to claim 18.

* * * * *